(12) United States Patent
Marwah et al.

(10) Patent No.: US 9,292,040 B2
(45) Date of Patent: Mar. 22, 2016

(54) SYNTHETIC TIME SERIES DATA GENERATION

(71) Applicant: Hewlett-Packard Development Company, L.P., Houston, TX (US)

(72) Inventors: Manish Marwah, Palo Alto, CA (US); Martin Arlitt, Calgary (CA); Amip J. Shah, Santa Clara, CA (US); Cullen E. Bash, Los Gatos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 317 days.

(21) Appl. No.: 13/874,221

(22) Filed: Apr. 30, 2013

(65) Prior Publication Data
US 2014/0325251 A1    Oct. 30, 2014

(51) Int. Cl.
G06F 1/14       (2006.01)
G06F 17/30      (2006.01)
G06Q 10/06      (2012.01)

(52) U.S. Cl.
CPC ............ *G06F 1/14* (2013.01); *G06F 17/30551* (2013.01); *G06F 17/30592* (2013.01); *G06Q 10/06* (2013.01)

(58) Field of Classification Search
None
See application file for complete search history.

(56) References Cited

PUBLICATIONS

Keogh "Locally Adaptive Dimensionality Reduction for Indexing Large Time Series Databases" ACM SIGMOD May 2001.*
Raychaudhuri, "Principal Components Analysis to Summarize Microarray Experiments: Application to Sporulation Time Series", Pac Symp Biocomput, p. 455-466, 2000.*
Holmstrom "The Accuracy and the Computational Complexity of a Multivariate Binned Kernel Density Estimator," Academic Press, 2000.*
Lutkepohl, "New Introduction to Multiple Time Series Analysis" Springer Science & Business Media, 2005.*
STIC search Nov. 20, 2015.*
Google search Nov. 20, 2015.*
Westra, Seth, et al., "Modeling Multivariable Hydrological Series: Principal Component Analysis or Independent Component Analysis", Jun. 29, 2007; vol. 43, Issue 6. < http://water.columbia.edu/files/2011/11/Lall2007Modeling.pdf >.

* cited by examiner

*Primary Examiner* — Kakali Chaki
*Assistant Examiner* — Isidore Sobkowski
(74) *Attorney, Agent, or Firm* — Mannava & Kang, P.C.

(57) ABSTRACT

According to an example, synthetic time series data generation may include receiving time series data for a plurality of users, and applying dimensionality reduction to transform the time series data from a high dimensional space n of the time series data to a low dimensional space m, where m<n. The transformed time series data may be used to estimate a time series data density in the low dimensional space m by generating a density function. The density function may be sampled for data, and the sampled data may be transformed back to the high dimensional space n to generate the synthetic time series data.

15 Claims, 7 Drawing Sheets

SYNTHETIC TIME SERIES DATA GENERATION

BACKGROUND

A variety of devices record data in predetermined intervals over a predetermined duration. For example, smart meters typically record resource consumption in predetermined intervals (e.g., monthly, hourly, etc.), and communicate the recorded consumption information to a utility for monitoring, evaluation, and billing purposes. The recorded time series data is typically analyzed, for example, by a data management system, to optimize aspects related to electric energy usage, power resources, etc.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

For smart meters that typically record data related to consumption of resources such as electricity, gas, water, etc., sensory data related to motion, traffic, etc., or other types of time series data, analysis of such time series data may be performed by a data management system. The scope of such analysis can be limited, for example, based on the availability of empirical (i.e., real) time series data. Moreover, performance testing of such data management systems at scale can be challenging due to the unavailability of large amounts of empirical time series data (e.g., data for tens to hundreds of millions of users). In order to generate such large amounts of time series data, a comparably smaller amount of empirical time series data may be replicated with appropriate changes to data fields such as meter IDs and timestamps. Alternatively, entirely synthetic datasets may be used. For example, although fields such as meter IDs may be realistically generated, time series data values may be randomly generated. Such techniques for generation of large amounts of synthetic data can negatively impact the accuracy of the performance testing of the data management systems. For example, if the synthetic data is generated by duplicating empirical data, a very high degree of data compression may result. On the other hand, if the synthetic data is completely random, data compression is likely to be poorer than in an empirical data set.

According to an example, a synthetic time series data generation apparatus and a method for synthetic time series data generation are disclosed herein. For the apparatus and method disclosed herein, synthetic time series data may be generated by using a relatively small set of an empirical smart meter dataset such that the synthetic time series data has similar statistical properties to those of the small empirical smart meter dataset. The synthetic time series data may be used for performance and scalability testing, for example, for data management systems.

Generally, for the apparatus and method disclosed herein, the joint distribution of a sequence of data (e.g., monthly power consumption over a year) may be modeled. For a small empirical dataset, a linear dimensionality reduction technique, such as principal component analysis (PCA), may be used to transform the empirical dataset from a high dimensional space to a low dimensional space. The transformed empirical dataset may be used to estimate a density (i.e., a time series data density) in the low dimensional space, for example, by performing a kernel density estimate. The transformation of the empirical dataset from the high dimensional space to the low dimensional space and the kernel density estimate may be used to generate a synthetic time series data model. In order to generate the synthetic time series data using the model, the low dimensional space may be sampled, and the sampled data may be transformed back to the high dimensional space.

For the apparatus and method disclosed herein, any amount of synthetic time series data may be generated based on a relatively small amount of empirical data. For example, time series data for any number of users may be generated, given such time series data for a limited number of users (i.e., a real time series), such that the statistical properties of the generated time series data are similar to the real time series data. The empirical data may include, for example, time series data measurements for resources such as electricity, gas, water, etc. The synthetic time series data may be used, for example, for scalability and performance testing of data management and analytics solutions. Further, the synthetic time series data may generally retain the properties of the limited amount of empirical data used to derive the parameters of the synthetic time series data model used to generate the synthetic time series data.

Figure 1:
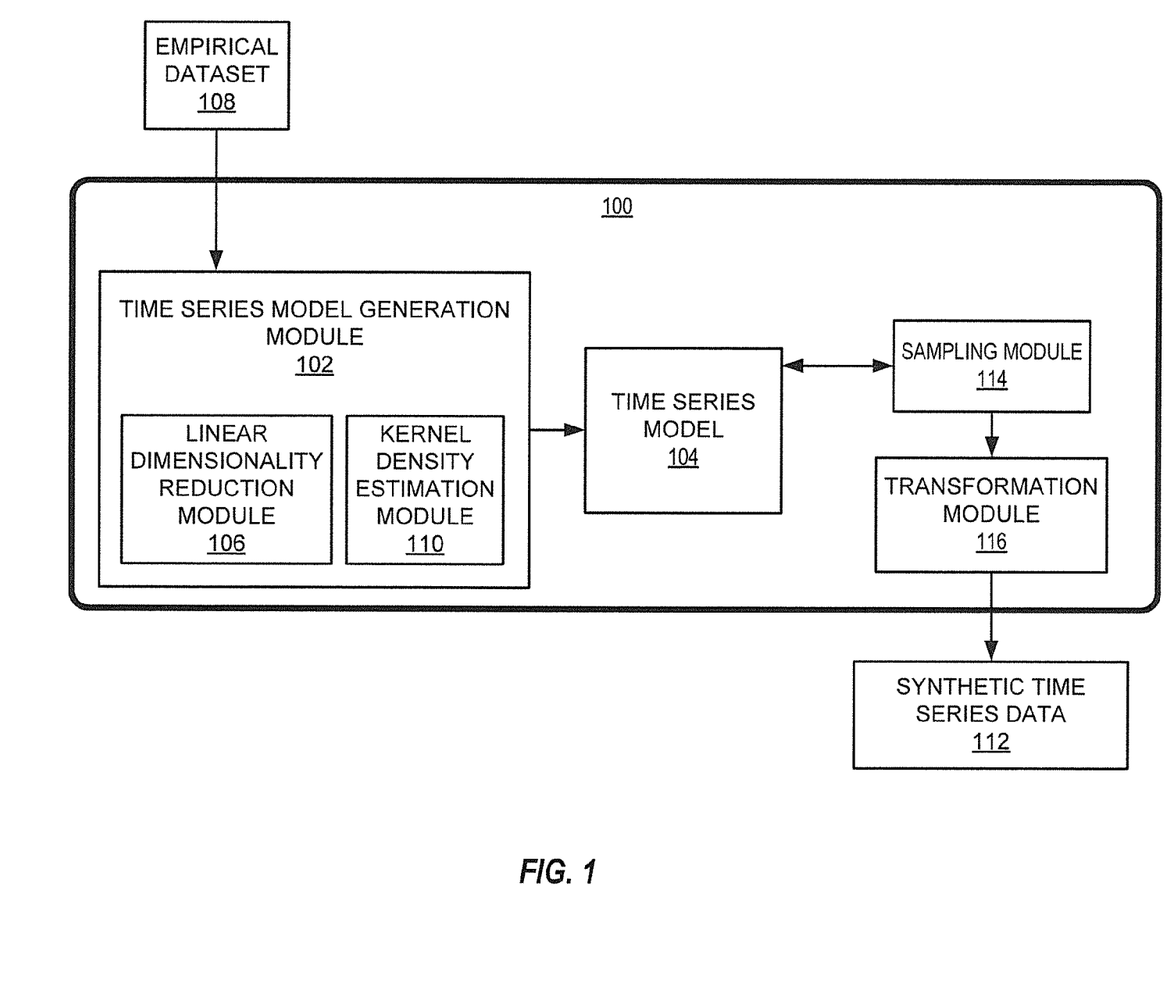
FIG. 1 illustrates an architecture of a synthetic time series data generation apparatus, according to an example of the present disclosure.

FIG. 1 illustrates an architecture of a synthetic time series data (STSD) generation apparatus 100, according to an example. Referring to FIG. 1, the apparatus 100 is depicted as including a time series model generation module 102 to generate a time series model 104. The time series model generation module 102 may include a linear dimensionality reduction module 106 to receive an empirical dataset 108 and apply a linear dimensionality reduction technique to transform the empirical dataset 108 from a high dimensional space to a low dimensional space. A kernel density estimation module 110 of the time series model generation module 102 may use the transformed time series data to estimate a density in the low dimensional space m by performing a binned multivariate kernel density estimate to generate a density function. In order to generate STSD 112 using the time series model 104, a sampling module 114 may sample the low dimensional space (i.e., sample data from the density function), and a transformation module 116 may transform the sampled data back to the high dimensional space.

The modules 102, 106, 110, 114, and 116, and other components of the apparatus 100 that perform various other functions in the apparatus 100, may include machine readable instructions stored on a non-transitory computer readable medium. In addition, or alternatively, the modules 102, 106, 110, 114, and 116, and other components of the apparatus 100 may include hardware or a combination of machine readable instructions and hardware.

Figure 2:
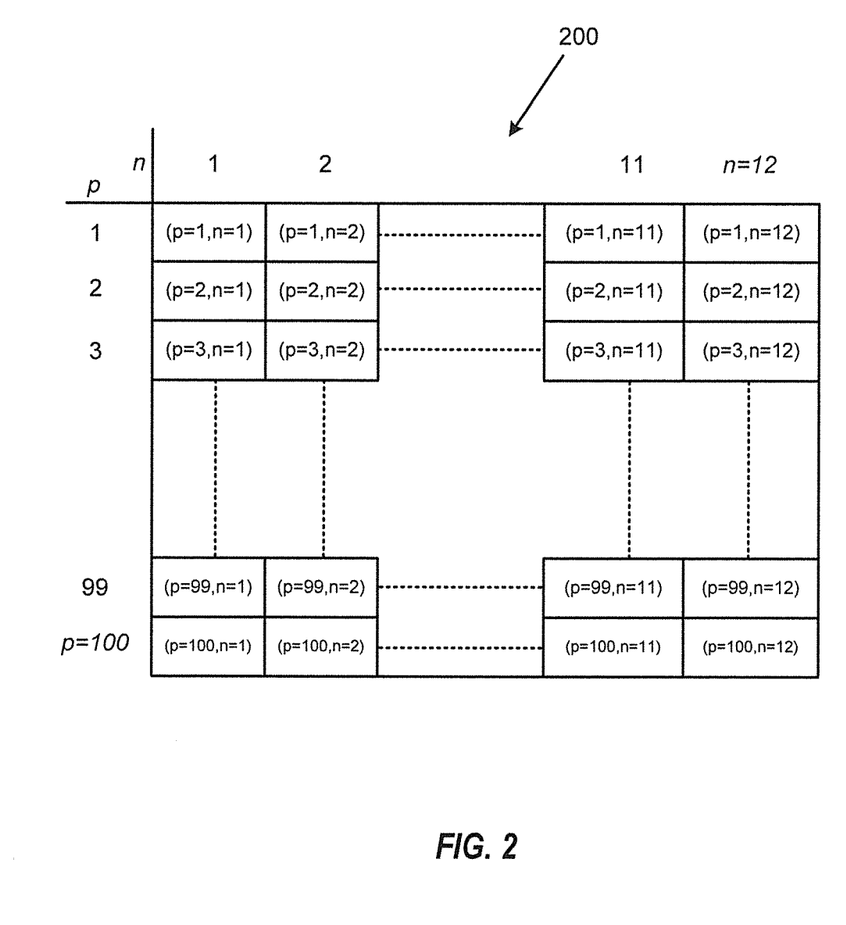
FIG. 2 illustrates a time series data matrix of sequences and data points, according to an example of the present disclosure.

Referring to FIGS. 1 and 2, FIG. 2 illustrates a time series data matrix 200 of sequences and data points, according to an example of the present disclosure. Given a sequence of the empirical dataset 108 (i.e., empirical measurements), $x_1, x_2, x_3, \ldots, x_n$, for example, monthly time series data for a year (i.e., n=12), the time series model generation module 102 may model the joint probability distribution of the sequence as follows:

$$P(x_1, x_2, x_3, \ldots, x_n) \quad \text{Equation (1)}$$

The joint probability distribution of Equation (1) may be sampled to generate a sequence of n data points. Accordingly, the STSD 112 may be drawn from the same joint probability distribution as the empirical dataset 108.

With respect to the empirical dataset 108, since each of the $x_i$ values are not independent (i.e., the $x_i$ values are correlated), estimating the joint probability distribution for a large value of n can be challenging due to dimensionality. The linear dimensionality reduction module 106 may use a linear dimensionality reduction technique, such as principal component analysis (PCA), to transform the empirical dataset 108 to a lower dimensional space, that is, from a high dimensional space n to a low dimensional space m, where m<n. Alternatively, the linear dimensionality reduction module 106 may use other linear dimensionality reduction techniques such as independent component analysis (ICA), singular value decomposition (SVD), factor analysis, etc., to transform the empirical dataset 108 to the lower dimensional space.

The empirical dataset 108 may include, for example, consumption data for each hour of a day, each day of a week, each day of a month, or each month of a year, etc. The number of data points in a sequence (i.e., $x_1, x_2, x_3, \ldots, x_n$), that is, the length of the empirical dataset 108, may represent the dimensionality (i.e., n) of each of the time series of each user for the empirical dataset 108. In the example of FIG. 2, the empirical dataset 108 may include monthly consumption data for a year (i.e., n=12). The size of the empirical dataset 108, that is, the number of such sequences, may be represented by p. For the example of FIG. 2, the empirical dataset 108 may include monthly consumption data for 100 users (i.e., p=100).

As discussed above, the linear dimensionality reduction module 106 may use a linear dimensionality reduction technique to transform the empirical dataset 108 to a low dimension m. In other words, the linear dimensionality reduction module 106 may use a linear dimensionality reduction technique to transform the p×n matrix of FIG. 2 to a p×m matrix. In order to determine the size of the low dimension m, the linear dimensionality reduction module 106 may evaluate the amount of variance in the empirical dataset 108 that is captured in the lower dimension. For example, the linear dimensionality reduction module 106 may select a low dimension m such that most of the variance (e.g., 80% to 90%) is captured. The acceptable amount of variance may be set by a user of the STSD apparatus 100, for example, as a threshold variance. Alternatively or additionally, the linear dimensionality reduction module 106 may evaluate the error in reconstructing the data in the original space (i.e., in the high dimension n) after transformation to the low dimension m.

Figure 3:
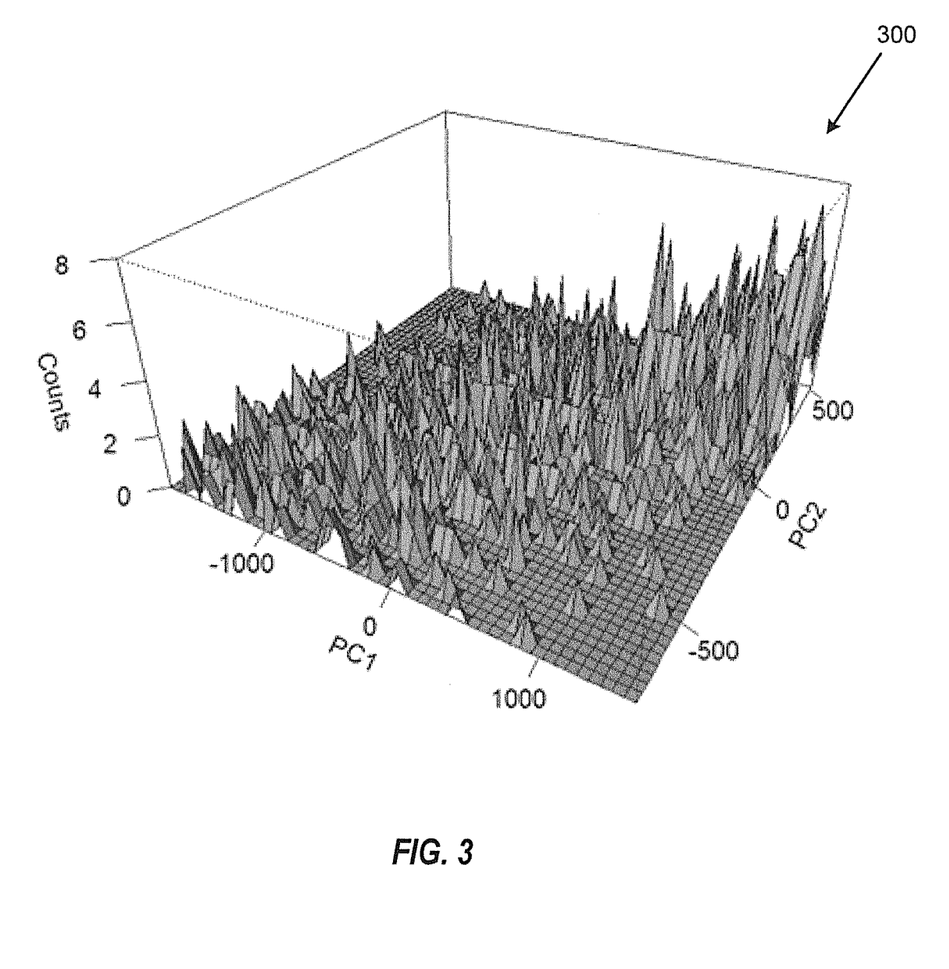
FIG. 3 illustrates a two-dimensional histogram of twelve dimensional data (e.g., monthly power consumption) projected into two dimensions, according to an example of the present disclosure.

For example, FIG. 3 illustrates a two-dimensional histogram 300 of twelve dimensional data (e.g., monthly power consumption for a year; i.e., n=12) projected into two dimensions (i.e., m=2), according to an example of the present disclosure. For the example of FIG. 3, the linear dimensionality reduction module 106 may use PCA to transform the empirical dataset 108 from a high dimensional space n=12 to a low dimensional space m=2. For example, the linear dimensionality reduction module 106 may use a linear dimensionality reduction technique to transform the p×n (i.e., 100×12) matrix of FIG. 2 to a p×m (i.e., 100×2) matrix. In the example of FIG. 3, a low dimension of m=2 may represent a variance in the range of 80% to 90% of that in the high dimension, n. Therefore, if a higher variance capture is needed, a low dimension m of greater than two may be used by the linear dimensionality reduction module 106. An increase in the low dimensionality may directly correspond to data independence. For the example of FIG. 3, PC1 and PC2 may represent first and second dimensions respectively related to m=1 and m=2, and the counts may represent the value of the p data points.

Figure 4:
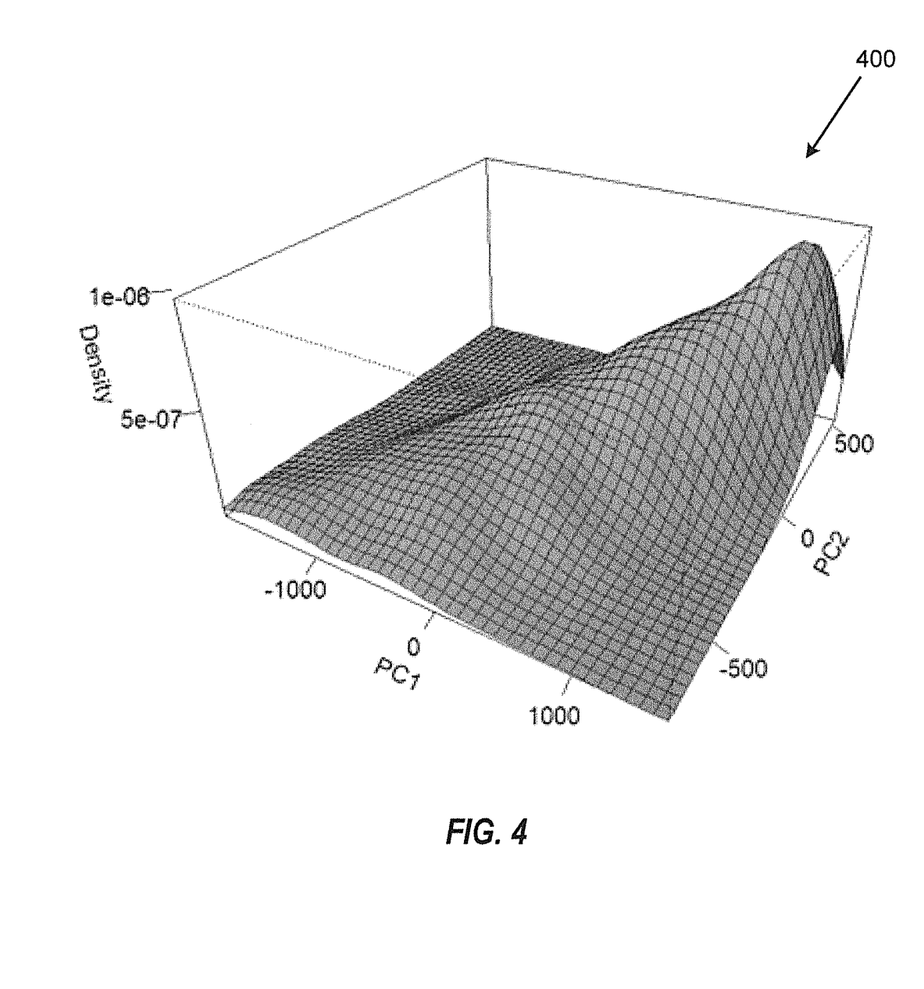
FIG. 4 illustrates a binned multivariate kernel density estimation of the twelve dimensional data transformed into two dimensional space, according to an example of the present disclosure.

The transformation performed by the linear dimensionality reduction module 106 may result in p points in m dimensional space, where p represents the number of sequences in the m dimensional space. These p points may be used to estimate the density in the m dimensional space. Since p may be large, the kernel density estimation module 110 may perform a binned multivariate kernel density estimate. For example, FIG. 4 illustrates a binned multivariate kernel density estimation 400 of the twelve dimensional data (i.e., n=12) transformed into two dimensional space (i.e., m=2), according to an example of the present disclosure.

With respect to the kernel density estimation module 110, a multivariate probability density function, f, using kernel estimation, may be defined as follows:

$$f_H(x) = \frac{1}{p}\sum_{i=1}^{p} K_H(x - x_i) \quad \text{Equation (2)}$$

For Equation (2), x may represent a m dimensional vector, H may represent an m×m matrix, p may represent the number of points in m dimensional space (i.e., the number of sequences in the m dimensional space), and K may represent the kernel (e.g., Gaussian).

As discussed above, the transformation of the empirical dataset from the high dimensional space to the low dimensional space and the kernel density estimate may be used to generate the time series model 104. The time series model 104 may be represented by the kernel density function (i.e., Equation (2)) that is estimated in the low dimensional space (e.g., m=2). The time series model 104 may be used to generate the STSD 112 as follows. The sampling module 114 may draw a sample at random from the m-dimensional density function (i.e., Equation (2)). In order to facilitate this process, a large number of points may be pre-sampled from the m-dimensional density function and saved. Then a point from this pre-sampled set of points may be randomly picked. For the example of FIG. 4, the randomly picked point may provide two values (i.e., along PC1 and PC2 dimensions). Similarly, if pre-sampling is not used, the point based on the random sampling of the m-dimensional density function may provide two values (i.e., along PC1 and PC2 dimensions).

For the point that is randomly picked (or based on the random sampling of the m-dimensional density function), the transformation module 116 may project the point from the low dimensional space m into the original high dimensional space n to generate one synthetic sequence. For example, the transformation module 116 may use matrix multiplication to project the point from the low dimensional space m into the original high dimensional space n to generate one synthetic sequence of dimension n. The synthetic sequence of dimension n may represent a synthetic sequence for a user. Similarly, any number of a plurality of points may be picked and projected into the original high dimensional space n by the transformation module 116 to generate the STSD 112 for a plurality of users. In this manner, the number of points that are picked and projected into the original high dimensional space n may exceed the original number of data points (i.e., p) such that the STSD 112 may generally retain the properties of the limited empirical dataset 108.

Figure 5:
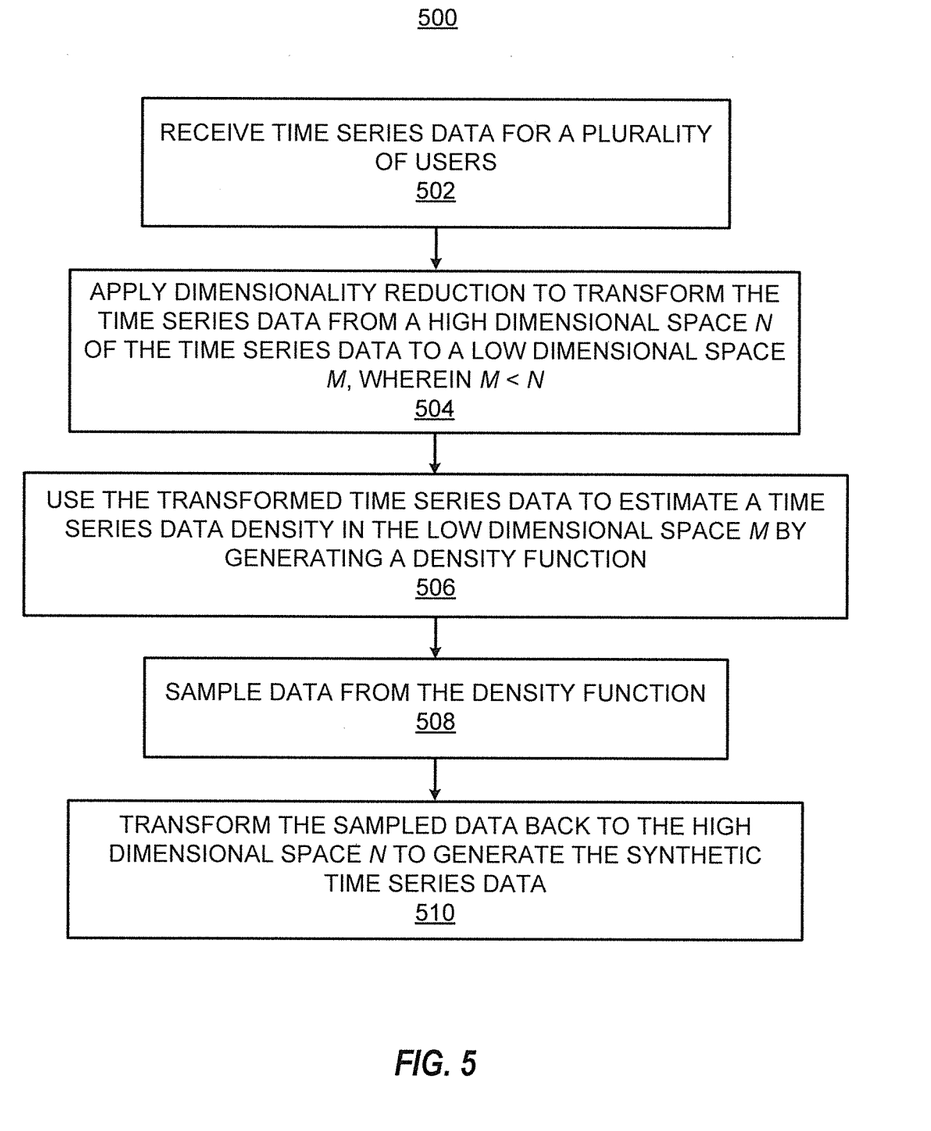
FIG. 5 illustrates a method for synthetic time series data generation, according to an example of the present disclosure.
Figure 6:
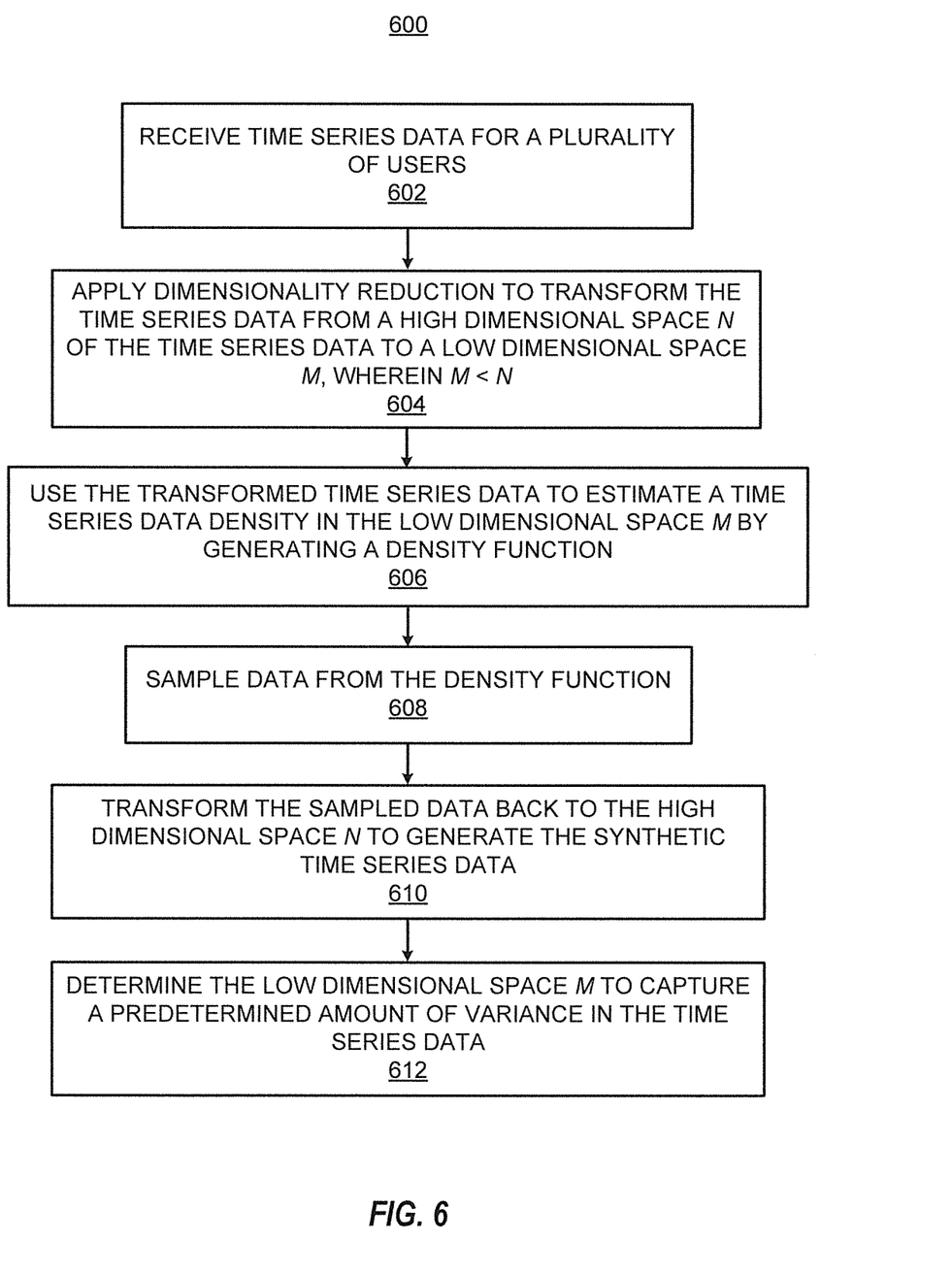
FIG. 6 illustrates further details of the method for synthetic time series data generation, according to an example of the present disclosure.

FIGS. 5 and 6 respectively illustrate flowcharts of methods 500 and 600 for synthetic time series data (STSD) generation, corresponding to the example of the STSD generation apparatus 100 whose construction is described in detail above. The methods 500 and 600 may be implemented on the STSD generation apparatus 100 with reference to FIG. 1 by way of example and not limitation. The methods 500 and 600 may be practiced in other apparatus.

Referring to FIG. 5, for the method 500, at block 502, time series data may be received for a plurality of users. For example, referring to FIG. 1, the linear dimensionality reduction module 106 may receive the empirical dataset 108.

At block 504, dimensionality reduction may be applied to transform the time series data from a high dimensional space n of the time series data to a low dimensional space m, where m<n. For example, referring to FIG. 1, the linear dimensionality reduction module 106 may apply a linear dimensionality reduction technique to transform the empirical dataset 108 from a high dimensional space to a low dimensional space.

At block 506, the transformed time series data may be used to estimate a time series data density in the low dimensional space m by generating a density function. For example, referring to FIG. 1, the kernel density estimation module 110 may use the transformed time series data to estimate a density in the low dimensional space m by performing a binned multivariate kernel density estimate to generate a density function.

At block 508, data may be sampled from the density function. For example, referring to FIG. 1, the sampling module 114 may sample the low dimensional space (i.e., sample data from the density function).

At block 510, the sampled data may be transformed back to the high dimensional space n to generate the synthetic time series data. For example, referring to FIG. 1, the transformation module 116 may transform the sampled data back to the high dimensional space n.

Referring to FIG. 6, for the method 600, at block 602, time series data may be received for a plurality of users.

At block 604, dimensionality reduction may be applied to transform the time series data from a high dimensional space n of the time series data to a low dimensional space m, where m<n. For example, linear dimensionality reduction may be applied to transform the time series data from the high dimensional space n of the time series data to the low dimensional space m.

At block 606, the transformed time series data may be used to estimate a time series data density in the low dimensional space m by generating a density function. For example, a binned multivariate kernel density estimate may be performed to generate the density function.

At block 608, data may be sampled from the density function. For example, data may be randomly sampled from the density function. Further, sampling the density function may include pre-sampling a plurality of data points from the density function, and selecting (e.g., randomly) a data point from the plurality of pre-sampled data points.

At block 610, the sampled data may be transformed back to the high dimensional space n to generate the synthetic time series data. For example, the sampled data may be projected back to the high dimensional space n. For the pre-sampled data points, the selected data point may be transformed back to the high dimensional space n to generate the synthetic time series data.

At block 612, the low dimensional space m may be determined so as to capture a predetermined amount of variance in the time series data.

Figure 7:
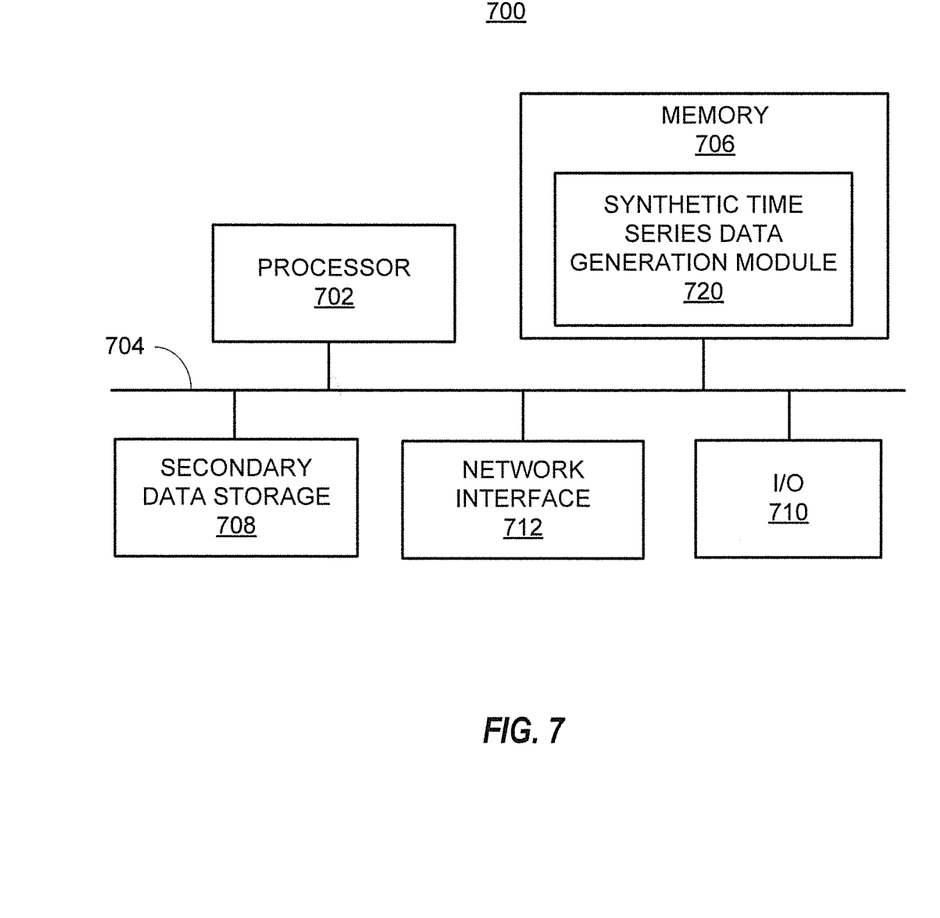
FIG. 7 illustrates a computer system, according to an example of the present disclosure.

FIG. 7 shows a computer system 700 that may be used with the examples described herein. The computer system represents a generic platform that includes components that may be in a server or another computer system. The computer system 700 may be used as a platform for the apparatus 100. The computer system 700 may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, memristors, and flash memory).

The computer system 700 includes a processor 702 that may implement or execute machine readable instructions performing some or all of the methods, functions and other processes described herein. Commands and data from the processor 702 are communicated over a communication bus 704. The computer system also includes a main memory 706, such as a random access memory (RAM), where the machine readable instructions and data for the processor 702 may reside during runtime, and a secondary data storage 708, which may be non-volatile and stores machine readable instructions and data. The memory and data storage are examples of computer readable mediums. The memory 706 may include a STSD generation module 720 including machine readable instructions residing in the memory 706 during runtime and executed by the processor 702. The STSD generation module 720 may include the modules 102, 106, 110, 114, and 116 of the apparatus shown in FIG. 1.

The computer system 700 may include an I/O device 710, such as a keyboard, a mouse, a display, etc. The computer system may include a network interface 712 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for generating synthetic time series data from time series data collected by a time series data measurement device, the method comprising:
   receiving the time series data, wherein the time series data is stored on a memory device;
   applying dimensionality reduction to transform the time series data from a high dimensional space n of the time series data to a low dimensional space m, wherein m<n;
   using the transformed time series data to estimate a time series data density in the low dimensional space m by generating a density function;
   sampling data from the density function; and
   transforming, by a processor, the sampled data back to the high dimensional space n to generate the synthetic time series data, wherein the processor is to utilize the synthetic time series data to represent the time series data.

2. The method of claim 1, wherein applying dimensionality reduction to transform the time series data from the high dimensional space n of the time series data to the low dimensional space m further comprises:
   applying linear dimensionality reduction to transform the time series data from the high dimensional space n of the time series data to the low dimensional space m.

3. The method of claim 1, wherein applying dimensionality reduction to transform the time series data from the high dimensional space n of the time series data to the low dimensional space m further comprises:
   applying principal component analysis (PCA) to transform the time series data from the high dimensional space n of the time series data to the low dimensional space m.

4. The method of claim 1, wherein using the transformed time series data to estimate the time series data density in the low dimensional space m by generating the density function further comprises:
   performing a binned multivariate kernel density estimate to generate the density function.

5. The method of claim 1, wherein sampling data from the density function further comprises:
   randomly sampling data from the density function.

6. The method of claim 1, wherein transforming the sampled data back to the high dimensional space n to generate the synthetic time series data further comprises:
   projecting the sampled data back to the high dimensional space n.

7. The method of claim 1, wherein receiving time series data for the plurality of users further comprises:
   receiving empirical time series data for the plurality of users.

8. The method of claim 1, further comprising:
   determining the low dimensional space m so as to capture a predetermined amount of variance in the time series data.

9. The method of claim 1, wherein sampling data from the density function, and transforming the sampled data back to the high dimensional space n to generate the synthetic time series data further comprise:
   pre-sampling a plurality of data points from the density function;
   selecting a data point from the plurality of pre-sampled data points; and
   transforming the selected data point back to the high dimensional space n to generate the synthetic time series data.

10. The method of claim 9, wherein selecting the data point from the plurality of pre-sampled data points further comprises:
    randomly selecting the data point from the plurality of pre-sampled data points.

11. An apparatus to generate synthetic time series data from time series data collected by a time series data measurement device, the apparatus comprising:
    a memory storing machine readable instructions to:
       receive the time series data;
       apply dimensionality reduction to transform the time series data from a high dimensional space n of the time series data to a low dimensional space m, wherein m<n;
       use the transformed time series data to estimate a time series data density in the low dimensional space m by performing a binned multivariate kernel density estimate to generate a density function;
       sample data from the density function; and
       transform the sampled data back to the high dimensional space n to generate the synthetic time series data; and
    a processor to implement the machine readable instructions, wherein the processor is to utilize the synthetic time series data to represent the time series data.

12. The synthetic time series data generation apparatus of claim 11, wherein to apply dimensionality reduction to transform the time series data from the high dimensional space n of the time series data to the low dimensional space m, the machine readable instructions are further to:
    apply linear dimensionality reduction to transform the time series data from the high dimensional space n of the time series data to the low dimensional space m.

13. The synthetic time series data generation apparatus of claim 11, wherein to sample data from the density function, the machine readable instructions are further to:
    randomly sample data from the density function.

14. The synthetic time series data generation apparatus of claim 11, further comprising machine readable instructions to:
    determine the low dimensional space m so as to capture a predetermined amount of variance in the time series data.

15. A non-transitory computer readable medium having stored thereon machine readable instructions to generate synthetic data from data that is collected by a time series data measurement device, the machine readable instructions, when executed, cause a computer system to:
    receive the data;
    apply linear dimensionality reduction to transform the data from a high dimensional space n of the data to a low dimensional space m, wherein m<n;
    use the transformed data to estimate a data density in the low dimensional space m by generating a density function;
    sample data points from the density function; and
    transform, by a processor, the sampled data points back to the high dimensional space n to generate the synthetic data, wherein the processor is to utilize the synthetic data to represent the data.

* * * * *